June 16, 1925.

W. H. SIKMA

HANDLING DEVICE

Filed Oct. 6, 1921

1,542,010

Inventor:
William H. Sikma,
by Spear, Middleton Donaldson & Hall
Attys.

Patented June 16, 1925.

1,542,010

UNITED STATES PATENT OFFICE.

WILLIAM H. SIKMA, OF OAKGLEN, ILLINOIS.

HANDLING DEVICE.

Application filed October 6, 1921. Serial No. 505,811.

*To all whom it may concern:*

Be it known that I, WILLIAM H. SIKMA, a citizen of the United States, and resident of Oakglen, in the county of Cook and State of Illinois, have invented certain new and useful Improvements in Handling Devices, of which the following is a specification.

My present invention relates to an apparatus to facilitate the bundling or bunching of asparagus, onions, or other stalk vegetable which is marketed in such form.

My main object is to produce such a device which will be of a portable nature so as to enable an operator to transport the same to or in proximity to the field where the vegetable is grown and at the same time be of a sturdy construction.

Stalked vegetables when brought from the field to the place of packing are usually placed in skeleton trays having a bottom and side walls, but no rear or front walls. It is impossible while picking or cutting said vegtables in the field to maintain a constant length for all stalks, therefore it becomes necessary to devise an apparatus by means of which the arrangement of the stalks so that they might be cut into uniform lengths would be facilitated.

To this end the invention consists in a table like member having its upper surface mounted upon a suitable support in such a manner that preferably one or more edges slope away from the operator.

It will be found necessary to provide certain walls to said table like member to aid in holding the stalks upon the same.

A satisfactory form of device embodying the principles of my invention is shown in the accompanying drawings, which, however, are merely illustrative of the best forms of the invention of which I am at present aware, and various changes and modifications may be made in the forms illustrated without departing from the spirit of my invention.

In the drawings:—

Figure 1:
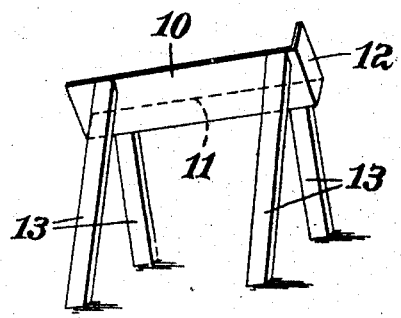
Figure 1 is a perspective view of one form of device mounted upon legs.
Figure 2:
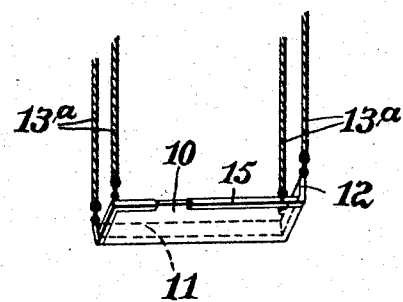
Fig. 2 is a perspective of another form swung from overhead.
Figure 3:
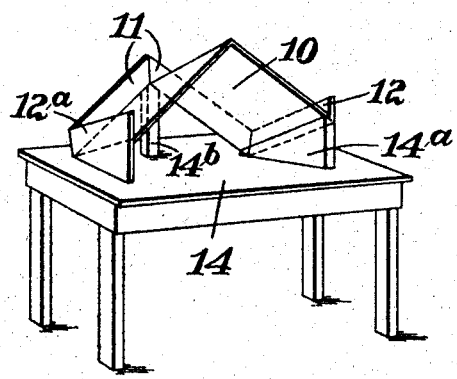
Figs. 3 and 5 are perspectives of other forms of the device in connection with an ordinary flat topped table.
Figure 4:
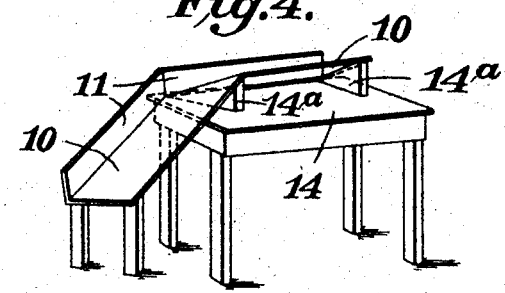
Fig. 4 is a perspective of another form of device being partially supported upon a table and partially supported upon its own legs.

Referring to the embodiment illustrated in the drawings, I provide a main supporting surface 10 which may take the form of either a single plane surface, as in Figs. 1 and 2, or dihedral faces, as in Figs. 3 and 4. Any combination of these two forms or any approximation thereof will be found satisfactory.

This surface is provided at its edge opposite the operator with a back wall 11 against which the ends of the stalks abut in order to properly arrange them before cutting into required lengths.

If desirable, additional side walls 12 may also be provided in order to aid in retaining the stalks in the device. Such forms are shown in Figs. 1, 2 and 3, while Fig. 4 is without side walls.

Various methods of supporting member 10 may be resorted to, such as providing legs 13 depending from the under side of member 10, or swingably supporting the same by means of rope, bands 13ª or the like of either rigid, semi-rigid, or spring construction, as shown in Fig. 2.

Figure 5:
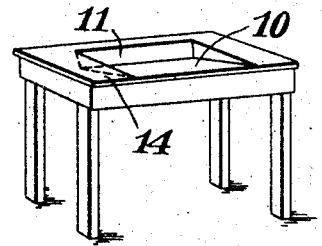

Fig. 5 shows the device built into an ordinary table 14 while Fig. 3 shows the device supported bodily upon the table. In this latter case triangular blocks 14ª will be necessary in order to give the proper inclination, or if desired, one of the end walls may be extended to engage the face of the table, as at 12ª. Additional supports 14ᵇ may also be required.

In some forms of the invention it may be desirable to support the same partially on a table top and partially upon its own legs, as in Fig. 4. Blocks 14ª will also be necessary, as above.

It will be noticed that in all forms, the member 10 is so supported that the edge opposite the operator slopes downwardly therefrom. This is essential as by such a design gravity is used to facilitate the orderly arrangement of the stalks placed upon member 10. For instance, if asparagus is being handled, the loose stalks from the field are placed upon member 10 with the heads toward the rear wall 11. Due to the angularity of the main supporting surface it will require a very small amount of effort to shake down or bodily place the stalks so that all heads tough the wall 11.

It may be desirable to place a bunching or cutting device, such as described in my patent No. 1,382,022, directly upon or in proximity to this device, and for this reason I have shown several forms, such as those of Figs. 1, 3 and 4, as having the member 10 also slope to one side, or to both, as may be desired. This sloping portion enables the stalks to be slid from the device to the cutting means mentioned above with the minimum amount of effort.

The entire device may be covered with any suitable covering if desirable, such as tin, water-proof fabric, or the like, to facilitate cleaning, and Fig. 2 shows the device provided with such a covering of tin 15.

Obviously any of the various forms of inclined surface may be mounted in a rigid manner upon its supporting member S, as shown in Figs. 1, 3, 4 and 5, or in a resilient or semi-rigid manner, as shown in Fig. 2.

What I claim is:

A device to facilitate the handling of stalked vegetables, comprising a trough having a supporting surface and a back wall forming a dihedral angle, the line of intersection of said surface and wall being lower than the opposite edge of the surface or wall, one lateral edge of surface and wall being lower than its opposite edge, the dihedral being open at its lowest point.

In testimony whereof, I affix my signature.

WILLIAM H. SIKMA.